US012635014B2

(12) United States Patent
Hou

(10) Patent No.: US 12,635,014 B2
(45) Date of Patent: May 19, 2026

(54) BLUETOOTH COMMUNICATION METHOD, TERMINAL DEVICE, AND COMPUTER-READABLE STORAGE MEDIUM

(71) Applicant: Huawei Technologies Co., Ltd., Shenzhen (CN)

(72) Inventor: Zhongjie Hou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 545 days.

(21) Appl. No.: 18/167,616

(22) Filed: Feb. 10, 2023

(65) Prior Publication Data

US 2023/0189366 A1     Jun. 15, 2023

Related U.S. Application Data

(63) Continuation of application No. PCT/CN2021/109298, filed on Jul. 29, 2021.

(30) Foreign Application Priority Data

Aug. 13, 2020     (CN) .......................... 202010822689.1

(51) Int. Cl.
*H04L 12/26* (2006.01)
*H04W 76/15* (2018.01)

(52) U.S. Cl.
CPC .................................. *H04W 76/15* (2018.02)

(58) Field of Classification Search
None
See application file for complete search history.

(56) References Cited

U.S. PATENT DOCUMENTS

| 2011/0021142 A1* | 1/2011 | Desai ...................... H04W 4/80 |
| | | 455/41.2 |
| 2014/0364063 A1 | 12/2014 | Bell |
| 2017/0093727 A1 | 3/2017 | Chen et al. |
| 2019/0239061 A1 | 8/2019 | Takeuchi et al. |

FOREIGN PATENT DOCUMENTS

CN          111405534 A     7/2020

* cited by examiner

*Primary Examiner* — Zewdu A Beyen
(74) *Attorney, Agent, or Firm* — Conley Rose, P.C.

(57) ABSTRACT

A BLUETOOTH communication method includes, when obtaining a BLUETOOTH communication request corresponding to a second terminal device, a first terminal device determine, based on the BLUETOOTH communication request and connection information of an existing BLUETOOTH connection in the first terminal device, a BLUETOOTH operating mode currently corresponding to the first terminal device, to adjust an operating parameter of BLUETOOTH based on the BLUETOOTH operating mode. Further, the first terminal device adjusts current occupation on a BLUETOOTH air interface by the existing BLUETOOTH connection in the first terminal device, to reduce a BLUETOOTH air interface resource conflict in a plurality of BLUETOOTH connections.

20 Claims, 4 Drawing Sheets

Terminal device 100

(a)  (b)

BLUETOOTH COMMUNICATION METHOD, TERMINAL DEVICE, AND COMPUTER-READABLE STORAGE MEDIUM

CROSS-REFERENCE TO RELATED APPLICATIONS

This is a continuation of International Patent Application No. PCT/CN2021/109298 filed on Jul. 29, 2021, which claims priority to Chinese Patent Application No. 202010822689.1 filed on Aug. 13, 2020. The disclosures of the aforementioned applications are hereby incorporated by reference in their entireties.

TECHNICAL FIELD

This disclosure belongs to the field of communication technologies, and in particular, to a BLUETOOTH communication method, a terminal device, and a computer-readable storage medium.

BACKGROUND

BLUETOOTH of a terminal device usually supports a plurality of connections, that is, a same terminal device may communicate with a plurality of other terminal devices through BLUETOOTH. In the plurality of connections, because BLUETOOTH channels corresponding to all BLUETOOTH connections share a BLUETOOTH air interface, when the terminal device processes a BLUETOOTH communication request, the BLUETOOTH air interface may be occupied by another BLUETOOTH connection. Consequently, processing of the BLUETOOTH communication request fails or processing duration is excessively long, which affects user experience.

SUMMARY

Embodiments of this disclosure provide a BLUETOOTH communication method, a terminal device, and a computer-readable storage medium, to resolve the following problem. In a plurality of connections, when a terminal device processes a BLUETOOTH communication request, a BLUETOOTH air interface may have been occupied by another BLUETOOTH connection, consequently, processing of a BLUETOOTH communication request fails or processing duration is excessively long, which affects user experience.

According to a first aspect, an embodiment of this disclosure provides a BLUETOOTH communication method, applied to a first terminal device. The method may include obtaining connection information of an existing BLUETOOTH connection in the first terminal device when obtaining a BLUETOOTH communication request corresponding to a second terminal device, determining, based on the BLUETOOTH communication request and the connection information of the existing BLUETOOTH connection, a BLUETOOTH operating mode corresponding to the first terminal device, and adjusting an operating parameter of BLUETOOTH in the first terminal device based on the BLUETOOTH operating mode, and communicating with the second terminal device through the BLUETOOTH whose operating parameter is adjusted.

According to the BLUETOOTH communication method, when obtaining the BLUETOOTH communication request corresponding to the second terminal device, the first terminal device may obtain the connection information of the existing BLUETOOTH connection in the first terminal device, and may determine, based on the BLUETOOTH communication request and the connection information of the existing BLUETOOTH connection, the BLUETOOTH operating mode currently corresponding to the first terminal device. Then, the first terminal device may adjust the operating parameter of the BLUETOOTH based on the BLUETOOTH operating mode, and communicate with the second terminal device through the BLUETOOTH whose operating parameter is adjusted, to adjust the operating parameter of the BLUETOOTH based on the BLUETOOTH communication request and the existing BLUETOOTH connection. Further, the first terminal device adjusts current occupation on a BLUETOOTH air interface by the existing BLUETOOTH connection, to reduce a BLUETOOTH air interface resource conflict in a plurality of BLUETOOTH connections. In this way, sufficient and stable BLUETOOTH air interface resources may be provided for the first terminal device to process a newly obtained BLUETOOTH communication request. This ensures that the BLUETOOTH communication request is processed in a timely and effective manner, improves efficiency and a success rate of processing the BLUETOOTH communication request, meets an actual communication requirement of a user, and improves user experience, so that usability and practicability are high.

In a possible implementation of the first aspect, the BLUETOOTH communication request carries a data transmission identifier and a first device identifier corresponding to the second terminal device. The connection information of the existing BLUETOOTH connection includes a second device identifier corresponding to a terminal device connected through the existing BLUETOOTH connection.

Determining, based on the BLUETOOTH communication request and the connection information of the existing BLUETOOTH connection, a BLUETOOTH operating mode corresponding to the first terminal device may include performing matching between the first device identifier in the BLUETOOTH communication request and the second device identifier in the connection information, and when a second device identifier matching the first device identifier does not exist, determining, based on the data transmission identifier in the BLUETOOTH communication request, the BLUETOOTH operating mode corresponding to the first terminal device.

Optionally, determining, based on the data transmission identifier in the BLUETOOTH communication request, the BLUETOOTH operating mode corresponding to the first terminal device may include, when the data transmission identifier is a first preset identifier, determining that the BLUETOOTH operating mode corresponding to the first terminal device is a connection first mode, or when the data transmission identifier is a second preset identifier, determining that the BLUETOOTH operating mode corresponding to the first terminal device is a connection first mode and a transmission first mode.

An amount of transmitted data corresponding to the first preset identifier is less than an amount of transmitted data corresponding to the second preset identifier.

It should be noted that the first preset identifier is used to indicate that a small amount of data of less than or equal to 32 kilobytes (kB) is transmitted, and the second preset identifier is used to indicate a large amount of data of greater than 32 kB is transmitted.

Optionally, after performing matching between the first device identifier in the BLUETOOTH communication request and the second device identifier in the connection information, the method may further include, when the second device identifier matching the first device identifier exists, obtaining a BLUETOOTH type of an existing BLUETOOTH connection between the first terminal device and the second terminal device, and determining, based on the BLUETOOTH type and the data transmission identifier in the BLUETOOTH communication request, the BLUETOOTH operating mode corresponding to the first terminal device.

In this embodiment of this disclosure, whether the second terminal device establishes a BLUETOOTH connection to the first terminal device may be determined based on the first device identifier corresponding to the second terminal device and the second device identifier corresponding to the terminal device connected through the existing BLUETOOTH connection in the first terminal device. When the second terminal device does not establish a BLUETOOTH connection to the first terminal device, it may be determined that the second terminal device is a new device communicating with the first terminal device. In this case, the first terminal device may directly determine, based on the data transmission identifier in the BLUETOOTH communication request, the BLUETOOTH operating mode corresponding to the first terminal device. When the second terminal device establishes a BLUETOOTH connection to the first terminal device, the first terminal device may determine, based on the BLUETOOTH type of the BLUETOOTH connection established between the second terminal device and the first terminal device and the data transmission identifier in the BLUETOOTH communication request, the BLUETOOTH operating mode corresponding to the first terminal device.

Further, determining, based on the BLUETOOTH type and the data transmission identifier in the BLUETOOTH communication request, the BLUETOOTH operating mode corresponding to the first terminal device may include, when the BLUETOOTH type is BLUETOOTH Low Energy (BLE), and the data transmission identifier in the BLUETOOTH communication request is the second preset identifier, determining that the BLUETOOTH operating mode corresponding to the first terminal device is a connection first mode and a transmission first mode, or when the BLUETOOTH type is classic BLUETOOTH, and the data transmission identifier in the BLUETOOTH communication request is the second preset identifier, determining that the BLUETOOTH operating mode corresponding to the first terminal device is a transmission first mode.

For example, after the determining that the BLUETOOTH operating mode corresponding to the first terminal device is a connection first mode and a transmission first mode, the adjusting an operating parameter of BLUETOOTH in the first terminal device based on the BLUETOOTH operating mode, and communicating with the second terminal device through the BLUETOOTH whose operating parameter is adjusted may include adjusting the operating parameter of the BLUETOOTH in the first terminal device based on the connection first mode, and establishing a classic BLUETOOTH connection between the first terminal device and the second terminal device through the BLUETOOTH whose operating parameter is adjusted, and after determining that the classic BLUETOOTH connection between the first terminal device and the second terminal device is established, adjusting the operating parameter of the BLUETOOTH in the first terminal device based on the transmission first mode, and performing data transmission between the first terminal device and the second terminal device through the established classic BLUETOOTH connection.

In this embodiment of this disclosure, when the BLUETOOTH connection established between the second terminal device and the first terminal device is BLE, it indicates that only a small amount of data can be transmitted through the BLUETOOTH connection established between the second terminal device and the first terminal device. In this case, if the data transmission identifier in the BLUETOOTH communication request is the second preset identifier that needs to transmit a large amount of data, it indicates that the BLUETOOTH connection established between the second terminal device and the first terminal device cannot meet the BLUETOOTH communication request. Therefore, the first terminal device may determine that the BLUETOOTH operating mode corresponding to the first terminal device is the connection first mode and the transmission first mode. In the connection first mode, a basic rate (BR)/enhanced data rate (EDR) connection through which a large amount of data can be transmitted is established between the second terminal device and the first terminal device. Then, a large amount of data can be transmitted between the first terminal device and the second terminal device through the established BR/EDR connection. When the BLUETOOTH connection established between the second terminal device and the first terminal device is BR/EDR, it indicates that a large amount of data can be transmitted through the BLUETOOTH connection established between the second terminal device and the first terminal device. In this case, if the data transmission identifier in the BLUETOOTH communication request is the second preset identifier that needs to transmit a large amount of data, it indicates that the BLUETOOTH connection established between the second terminal device and the first terminal device can meet the BLUETOOTH communication request. Therefore, the first terminal device may determine that the BLUETOOTH operating mode corresponding to the first terminal device is the transmission first mode. In the transmission first mode, a large amount of data can be directly transmitted through an existing BR/EDR connection between the first terminal device and the second terminal device.

In a possible implementation of the first aspect, when BLUETOOTH communication requests corresponding to a plurality of second terminal devices are obtained, determining, based on the BLUETOOTH communication request and the connection information of the existing BLUETOOTH connection, a BLUETOOTH operating mode corresponding to the first terminal device may include determining, based on each BLUETOOTH communication request and the connection information of the existing BLUETOOTH connection, the BLUETOOTH operating mode corresponding to the first terminal device, and adjusting an operating parameter of BLUETOOTH in the first terminal device based on the BLUETOOTH operating mode, and communicating with the second terminal device through the BLUETOOTH whose operating parameter is adjusted includes, when all BLUETOOTH operating modes are a same BLUETOOTH operating mode, adjusting the operating parameter of the BLUETOOTH in the first terminal device based on the BLUETOOTH operating mode, and communicating with each second terminal device through the BLUETOOTH whose operating parameter is adjusted, or when all BLUETOOTH operating modes include the connection first mode and the transmission first mode, adjusting the operating parameter of the BLUETOOTH in the first terminal device based on the connection first mode, and establishing, through the BLUETOOTH whose operating parameter is adjusted, BLUETOOTH connections between the first terminal device and all of the second terminal devices that request to establish a BLUETOOTH connection, and after determining that the BLUETOOTH connections between the first terminal device and all of the second terminal devices that request to establish a BLUETOOTH connection are established, adjusting the operating parameter of the BLUETOOTH in the first terminal device based on the transmission first mode, and performing data transmission through the BLUETOOTH whose operating parameter is adjusted.

It should be noted that, when the first terminal device receives the BLUETOOTH communication requests corresponding to the plurality of second terminal devices at the same time, the first terminal device may determine, based on the connection information of the existing BLUETOOTH connection in the first terminal device and the BLU-ETOOTH communication request corresponding to each second terminal device, the BLUETOOTH operating mode corresponding to the first terminal device. When all BLU-ETOOTH operating modes determined based on each BLU-ETOOTH communication request are a same BLUETOOTH operating mode, the first terminal device may directly adjust the operating parameter of the BLUETOOTH in the first terminal device based on the BLUETOOTH operating mode, to process the BLUETOOTH communication request corresponding to each second terminal device. When all BLUETOOTH operating modes determined based on the BLUETOOTH communication request are different, the first terminal device may switch, based on determined priorities of all BLUETOOTH operating modes, the BLUETOOTH operating mode corresponding to the first terminal device. That is, the operating parameter of the BLUETOOTH in the first terminal device may be adjusted sequentially based on the priorities and all BLUETOOTH operating modes corresponding to the priorities.

In this embodiment of this disclosure, when the first terminal device does not obtain the BLUETOOTH communication request within preset duration, and the first terminal device currently has no BLUETOOTH channel on which data transmission is being performed, the first terminal device may determine that the BLUETOOTH operating mode corresponding to the first terminal device is a normal mode. In this case, the first terminal device may switch the BLUETOOTH operating mode corresponding to the first terminal device to the normal mode, that is, adjust the operating parameter of the BLUETOOTH in the first terminal device based on an operating parameter corresponding to the normal mode. The normal mode is an operating mode in which the BLUETOOTH in the first terminal device always camps.

It should be understood that adjusting an operating parameter of BLUETOOTH in the first terminal device based on the BLUETOOTH operating mode may include adjusting the operating parameter of the BLUETOOTH in the first terminal device based on a preset operating parameter corresponding to the BLUETOOTH operating mode. The preset operating parameter is at least one of a connection interval of a BLE connection, a connection timeout period of the BLE connection, a broadcast interval of a BLE broadcast, a scanning window ratio of BLE scanning, and a transmission status of classic BLUETOOTH.

According to a second aspect, an embodiment of this disclosure provides a BLUETOOTH communication apparatus, used in a first terminal device. The apparatus may include a status awareness module configured to obtain connection information of an existing BLUETOOTH connection in the first terminal device when a BLUETOOTH communication request corresponding to a second terminal device is obtained, a decision module configured to determine, based on the BLUETOOTH communication request and the connection information of the existing BLU-ETOOTH connection, a BLUETOOTH operating mode corresponding to the first terminal device, a channel management module configured to adjust an operating parameter of BLUETOOTH in the first terminal device based on the BLUETOOTH operating mode, and a BLUETOOTH module configured to communicate with the second terminal device through the BLUETOOTH whose operating parameter is adjusted.

According to a third aspect, an embodiment of this disclosure provides a terminal device, including a memory, a processor, and a computer program that is stored in the memory and can be run on the processor. When the processor executes the computer program, the terminal device is enabled to implement the BLUETOOTH communication method according to any one of the implementations of the first aspect.

According to a fourth aspect, an embodiment of this disclosure provides a computer-readable storage medium. The computer-readable storage medium stores a computer program. When the computer program is executed by a computer, the computer is enabled to implement the BLU-ETOOTH communication method according to any one of the implementations of the first aspect.

According to a fifth aspect, an embodiment of this disclosure provides a computer program product. When the computer program product is run on a terminal device, the terminal device is enabled to perform the BLUETOOTH communication method according to any one of the implementations of the first aspect.

It should be understood that, for beneficial effects of the second aspect to the fifth aspect, refer to related descriptions in the first aspect. Details are not described herein again.

DESCRIPTION OF EMBODIMENTS

Figure 1:
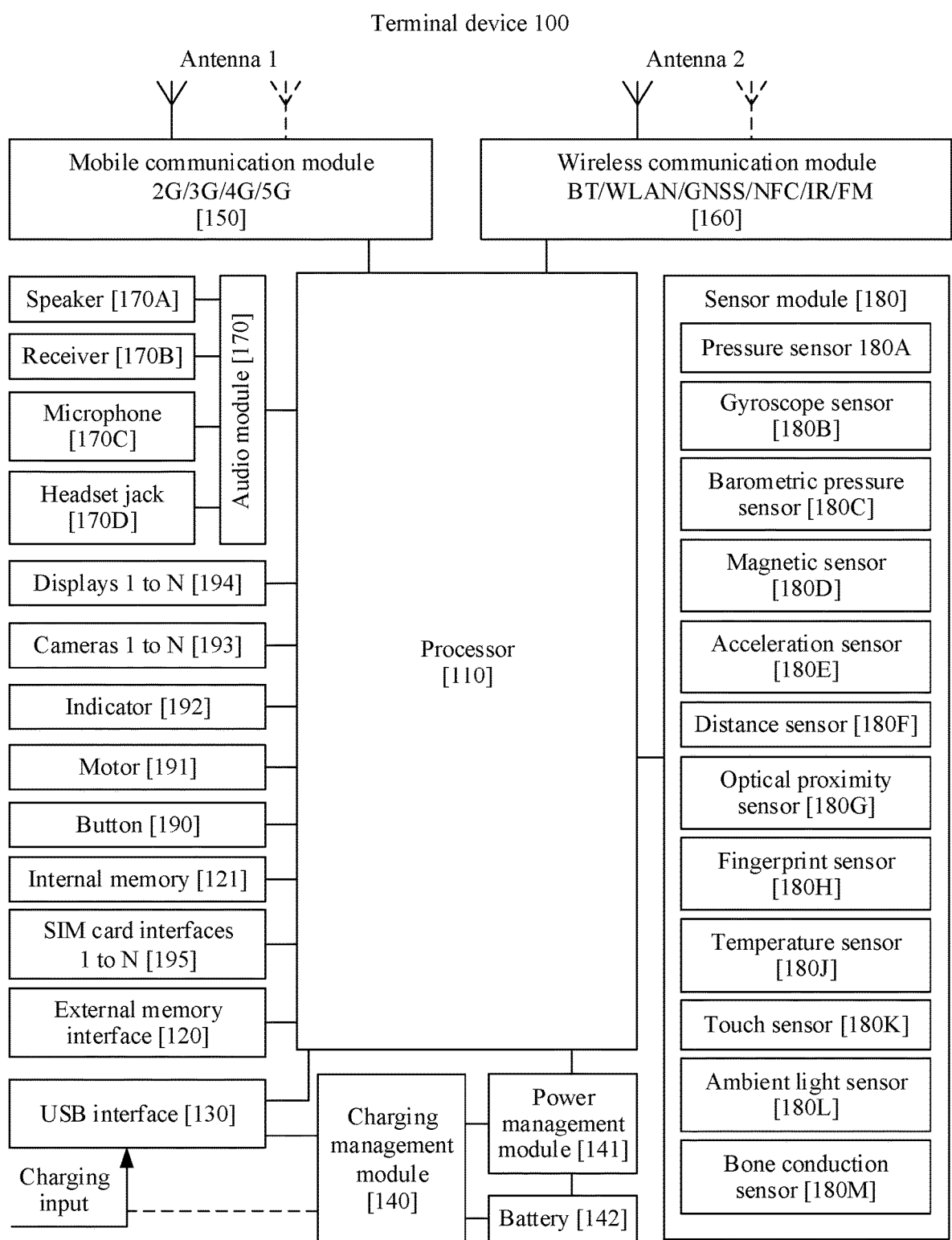
FIG. 1 is a schematic diagram of a structure of a terminal device to which a BLUETOOTH communication method is applicable according to an embodiment of this disclosure.

It should be understood that, when used in the specification and the appended claims of this disclosure, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this disclosure refers to any combination and all possible combinations of one or more associated listed items, and includes these combinations.

As used in the specification and the appended claims of this disclosure, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and claims of this disclosure, the terms "first", "second", "third", and the like are merely intended for a purpose of differentiated description, but shall not be understood as an indication or an implication of relative importance.

Reference to "an embodiment", "some embodiments", or the like described in the specification of this disclosure indicates that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean reference to a same embodiment, instead, they mean "one or more but not all of embodiments", unless otherwise emphasized. The terms "include", "comprise", "have", and their variants all mean "include but are not limited to", unless otherwise emphasized.

BLUETOOTH (BT) is a wireless communication technology widely used in the world, runs on an open frequency band of 2.4 gigahertz (GHz) to 2.485 GHz, and is widely used in short-range wireless transmission of 1 meter to 10 meters. The BT may include classic BLUETOOTH and BLE. The classic BLUETOOTH may be BR BLUETOOTH, or may be EDR BLUETOOTH. The BR/EDR has a high transmission rate, and is applicable to a scenario in which a data amount is large. For example, the BR/EDR is applicable to scenarios such as voice and music in which a large amount of data is transmitted. The BLE has advantages such as low power consumption and fast connection, but has a lower transmission rate than the BR/EDR. Therefore, the BLE is applicable to a scenario that has a high real-time requirement but a low data transmission rate. For example, the BLE is applicable to scenarios such as a mouse device, a keyboard, and a heart rate meter in which a small amount of data is transmitted.

BLUETOOTH of a terminal device usually supports a plurality of connections. That is, a same terminal device may perform BLUETOOTH communication (for example, BLUETOOTH connection and data transmission) with a plurality of other terminal devices through the BLUETOOTH. In the plurality of connections, BLUETOOTH channels corresponding to each BLUETOOTH connection shares a BLUETOOTH air interface. That is, the BLUETOOTH channels need to share a same BLUETOOTH air interface for data transmission, and the like. Therefore, when the terminal device obtains a new BLUETOOTH communication request, if a BLUETOOTH connection already exists in the terminal device, the BLUETOOTH air interface may have been occupied through the existing BLUETOOTH connection. In this case, when the terminal device performs BLUETOOTH connection and transmission based on the new BLUETOOTH communication request, there may be a BLUETOOTH air interface resource occupation conflict with the existing BLUETOOTH connection. Consequently, processing of the BLUETOOTH communication request may fail or processing duration is excessively long, which affects user experience.

In addition, with rapid development of terminal technologies and BLUETOOTH technologies, a terminal device like a mobile phone or a tablet with rich hardware resources may be integrated with a dual-mode BLUETOOTH chip that can support both the BLE and the BR/EDR. The BLE is usually used for discovery, connection, and networking between devices due to low power consumption and fast connection. The BR/EDR is usually used for data transmission between devices due to a high transmission rate. However, at a chip layer, the BLE and the BR/EDR also share a BLUETOOTH air interface. That is, the BLE channel and the BR/EDR channel also need to share a same BLUETOOTH air interface to transmit data. Therefore, when the terminal device obtains a new BLUETOOTH communication request (for example, a BR data transmission request), if a BLUETOOTH connection (for example, a BLE connection) already exists in the terminal device, the BLUETOOTH air interface may have been occupied by the existing BLE connection. In this case, there may be a BLUETOOTH air interface resource occupation conflict between BR data transmission and the existing BLE connection. Consequently, BR data transmission may fail or take a long time, which affects user experience.

In the conventional technology, conflicts between BLUETOOTH channels may be reduced by adjusting a timeslot. To be specific, when the terminal device receives a broadcast packet sent by a terminal device, the terminal device may obtain a time location of the broadcast packet, and may adjust, based on the time location, a timeslot of sending a BLE connection event, so that the adjusted timeslot of sending the BLE connection event is located in a timeslot not occupied by a BR/EDR synchronization data link packet.

In the foregoing manner, only a BLUETOOTH air interface resource occupation conflict that may exist between the BLE connection and BR data transmission is considered, and a conflict that may exist between BLE broadcast, BLE scanning, BR transmission, and the BLE connection is not involved. In addition, the foregoing manner is applicable only to a one-to-one connection. For a one-to-many connection, because a gap of a BLUETOOTH air interface is limited, an idle timeslot that is not occupied may not be found in a timeslot adjustment manner. In addition, in the foregoing manner, a timeslot is adjusted based on a BLUETOOTH chip layer and a BLUETOOTH protocol stack layer, and a priority of a BLUETOOTH communication request in actual application is not considered. In actual application, a priority of establishing a BLE connection is generally high. In this case, if packets of BR data transmission in the terminal device are frequently sent, a timeslot of sending the BLE connection determined by the terminal device may be relatively late. As a result, the BLE connection times out or the connection fails, and an actual communication requirement cannot be met.

To resolve the foregoing problems, embodiments of this disclosure provide a BLUETOOTH communication method, a terminal device, and a computer-readable storage medium. In the method, when obtaining a BLUETOOTH communication request corresponding to a second terminal device, a first terminal device may obtain connection information of an existing BLUETOOTH connection in the first terminal device, and may determine, based on the BLUETOOTH communication request and the connection information of the existing BLUETOOTH connection, a BLUETOOTH operating mode currently corresponding to the first terminal device. Then, the first terminal device may adjust an operating parameter of BLUETOOTH based on the BLUETOOTH operating mode, and communicate with the second terminal device through the BLUETOOTH whose operating parameter is adjusted, to adjust current occupation on a BLUETOOTH air interface by the existing BLUETOOTH connection, so as to reduce a BLUETOOTH air interface resource conflict in a plurality of BLUETOOTH connections. In this way, sufficient and stable BLUETOOTH air interface resources may be provided for the first terminal device to process a newly obtained BLUETOOTH communication request. This ensures that the BLUETOOTH communication request is processed in a timely and effective manner, improves efficiency and a success rate of processing the BLUETOOTH communication request, meets an actual communication requirement of a user, and improves user experience, so that usability and practicability are high.

In embodiments of this disclosure, the terminal devices (including the first terminal device and the second terminal device) are a terminal device having a BLUETOOTH communication function. The terminal device may be a mobile phone, a tablet computer, a wearable device, a vehicle-mounted device, an augmented reality (AR) device/a virtual reality (VR) device, a notebook computer, an ultra-mobile personal computer (UMPC), a netbook, a personal digital assistant (PDA), a laptop, or the like. A specific type of the terminal device is not limited in embodiments of this disclosure.

The following first describes the terminal device in embodiments of this disclosure. FIG. 1 is a schematic diagram of a structure of a terminal device 100.

The terminal device 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that, a structure illustrated in this embodiment of this disclosure does not constitute a specific limitation on the terminal device 100. In some other embodiments of this disclosure, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a two-way synchronization serial bus, and includes one serial data line (SDL) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface to implement a touch function of the terminal device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a BLUETOOTH headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a BLUETOOTH headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communication module 160. For example, the processor 110 communicates with a BLUETOOTH module in the wireless communication module 160 through the UART interface, to implement a BLUETOOTH function. In some embodiments, the audio module 170 may transmit an audio signal to the wireless communication module 160 through the UART interface, to implement a function of playing music through a BLUETOOTH headset.

The MIPI interface may be configured to connect the processor 110 to peripheral components such as the display 194 and the camera 193. The MIPI interface includes a camera serial interface (CSI), a display serial interface (DSI), and the like. In some embodiments, the processor 110 communicates with the camera 193 through the CSI interface, to implement an image shooting function of the terminal device 100. The processor 110 communicates with the display 194 through the DSI interface, to implement a display function of the terminal device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be a mini USB interface, a micro USB interface, a USB Type-C interface, or the like. The USB interface 130 may be used to connect to the charger to charge the terminal device 100, or may be used to transmit data between the terminal device 100 and a peripheral device, or may be configured to connect to a headset for playing audio through the headset. The interface may alternatively be used to connect to another terminal device, for example, an AR device.

It can be understood that an interface connection relationship between the modules illustrated in this embodiment of this disclosure is merely an example for description, and does not constitute a limitation on the structure of the terminal device 100. In some other embodiments of this disclosure, the terminal device 100 may alternatively use different interface connection manners in the foregoing embodiments or a combination of a plurality of interface connection manners.

The charging management module 140 is configured to receive a charging input from the charger. The charger may be a wireless charger or a wired charger. In some embodiments of wired charging, the charging management module 140 may receive charging input from a wired charger through the USB interface 130. In some embodiments of wireless charging, the charging management module 140 may receive a wireless charging input by using a wireless charging coil of the terminal device 100. When charging the battery 142, the charging management module 140 may further supply power to the terminal device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the terminal device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes second generation (2G)/third generation (3G)/fourth generation (4G)/fifth generation (5G) or the like and that is applied to the terminal device 100. The mobile communication module 150 may include at least one filter, a switch, a power amplifier, a low-noise amplifier (LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communication module 150 or another function module.

The wireless communication module 160 may provide a wireless communication solution that includes a wireless local area network (WLAN) (for example, a WI-FI network), BT, a global navigation satellite system (GNSS), frequency modulation (FM), a near-field communication (NFC) technology, an infrared (IR) technology, or the like and that is applied to the terminal device 100. The wireless communication module 160 may be one or more components integrating at least one communications processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

In some embodiments, the antenna 1 of the terminal device 100 is coupled to the mobile communication module 150, and the antenna 2 thereof is coupled to the wireless communication module 160, so that the terminal device 100 can communicate with a network and another device by using a wireless communication technology. The wireless communication technology may include a Global System for Mobile Communications (GSM), a General Packet Radio Service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a Global Positioning System (GPS), a global navigation satellite system (GNSS), a BEIDOU navigation satellite system (BDS), a quasi-zenith satellite system (QZSS), and/or a satellite based augmentation system (SBAS).

The terminal device 100 implements a display function by using a GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the terminal device 100 may include one or N displays 194, where N is a positive integer greater than 1.

The terminal device 100 may implement an image shooting function by using the ISP, the camera 193, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through a lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, green, and blue (RGB) or luma, blue projection, and red projection (YUV). In some embodiments, the terminal device 100 may include one or N cameras 193, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transform on frequency energy.

The video codec is configured to compress or decompress a digital video. The terminal device 100 may support one or more types of video codecs. In this way, the terminal device 100 may play or record videos in a plurality of coding formats, for example, Moving Picture Experts Group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. The NPU can implement applications such as intelligent cognition of the terminal device 100, for example, image recognition, facial recognition, speech recognition, and text understanding.

The external memory interface 120 may be configured to connect to an external memory card, for example, a micro Secure Digital (SD) card, to extend a storage capability of the terminal device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data or a phone book) created in a process of using the terminal device 100. In addition, the internal memory 121 may include a high-speed random-access memory (RAM), or may include a nonvolatile memory, for example, at least one magnetic disk storage device, a flash memory, or a Universal Flash Storage (UFS). The processor 110 performs various function applications and data processing of the terminal device 100 by running the instructions stored in the internal memory 121 and/or the instructions stored in the memory disposed in the processor.

The terminal device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal device 100 may be used to listen to music or answer a hands-free call through the speaker 170A.

The receiver 170B, also referred to as an "earpiece", is configured to convert an audio electrical signal into a sound signal. When a call is answered or voice information is received through the terminal device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to collect a sound signal and further implement a noise reduction function. In some other embodiments, three, four, or more microphones 170C may alternatively be disposed in the terminal device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 millimeter (mm) open mobile terminal platform (OMTP) standard interface or a cellular telecommunications industry association of the United States of America (USA) (CTIA) standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines pressure strength based on a capacitance change. When a touch operation is performed on the display 194, the terminal device 100 detects intensity of the touch operation by using the pressure sensor 180A. The terminal device 100 may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a messages application icon, an instruction for viewing a Short Message/Messaging Service (SMS) message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the terminal device 100. In some embodiments, angular velocities of the terminal device 100 around three axes (namely, x, y, and z axes) may be determined by using the gyroscope sensor 180B. The gyroscope sensor 180B may be configured to implement image stabilization during photographing. For example, when the shutter is pressed, the gyroscope sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyroscope sensor 180B may also be used in a navigation scenario and a somatic game scenario.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip cover by using the magnetic sensor 180D. In some embodiments, when the terminal device 100 is a flip phone, the terminal device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the terminal device 100. A magnitude and a direction of gravity may be detected when the terminal device 100 is stationary. The acceleration sensor 180E may be further configured to identify a posture of the terminal device, and is used in an application such as switching between a landscape mode and a portrait mode or a pedometer.

The distance sensor 180F is configured to measure a distance. The terminal device 100 may measure a distance by using infrared light or a laser. In some embodiments, in an image shooting scenario, the terminal device 100 may measure a distance by using the distance sensor 180F, to implement fast focusing.

The optical proximity sensor 180G may include, for example, an LED and an optical detector, for example, a photodiode. The LED may be an infrared LED. The terminal device 100 emits infrared light outward by using the LED. The terminal device 100 detects infrared reflected light from a nearby object by using the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The terminal device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal device 100 is in a pocket, to prevent accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of a processor located near the temperature sensor 180J, to reduce power consumption and implement heat protection. In some other embodiments, when the temperature is lower than another threshold, the terminal device 100 heats the battery 142, to avoid abnormal shutdown of the terminal device 100 caused by a low temperature. In some other embodiments, when the temperature is lower than still another threshold, the terminal device 100 boosts an output voltage of the battery 142, to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may alternatively be disposed on a surface of the terminal device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, may be a touch key. The terminal device 100 may receive a button input, and generate a button signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. For touch operations performed on different areas of the display 194, the motor 191 may alternatively correspond to different vibration feedback effects. Different application scenarios (for example, a time reminder, information receiving, an alarm clock, and a game) may alternatively correspond to different vibration feedback effects. A touch vibration feedback effect may be further customized.

The indicator 192 may be an indicator light, and may be configured to indicate a charging state and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The terminal device 100 interacts with a network through the SIM card, to implement functions such as calling and data communication. In some embodiments, the terminal device 100 uses an embedded SIM card (eSIM). The eSIM card may be embedded in the terminal device 100, and cannot be separated from the terminal device 100.

A software system of the terminal device 100 may use a layered architecture, an event-driven architecture, a micro-kernel architecture, a microservice architecture, or a cloud architecture. In embodiments of this disclosure, an ANDROID system with a layered architecture is used as an example to describe a software structure of the terminal device 100.

Figure 2:
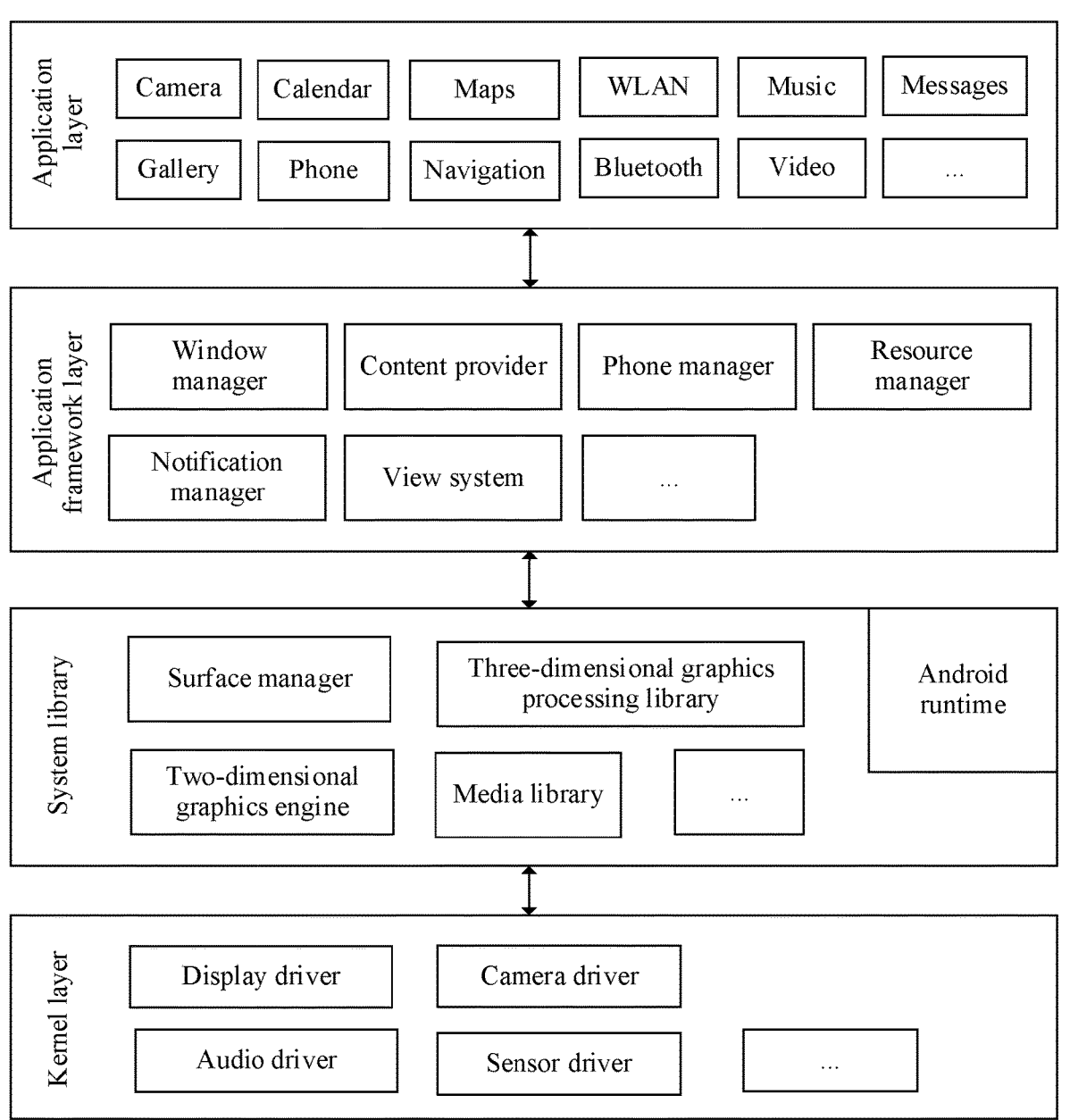
FIG. 2 is a schematic diagram of a software architecture to which a BLUETOOTH communication method is applicable according to an embodiment of this disclosure.

FIG. 2 is a block diagram of the software structure of the terminal device 100 according to an embodiment of this disclosure.

In a layered architecture, software is divided into several layers, and each layer has a clear role and task. The layers communicate with each other through a software interface. In some embodiments, the ANDROID system is divided into four layers: an application layer, an application framework layer, an ANDROID runtime and system library, and a kernel layer from top to bottom.

The application layer may include a series of application packages.

As shown in FIG. 2, the application packages may include applications such as camera, gallery, calendar, phone, map, navigation, WLAN, BLUETOOTH, music, videos, and messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application program. The data may include a video, an image, an audio, calls that are made and received, a browsing history, a bookmark, a phone book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function of the terminal device 100, for example, management of a call status (including answering, declining, or the like).

The resource manager provides various resources such as a localized character string, an icon, an image, a layout file, and a video file for an application program.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, a prompt tone is produced, the terminal device vibrates, or an indicator light blinks.

The ANDROID runtime includes a kernel library and a virtual machine. The ANDROID runtime is responsible for scheduling and management of the ANDROID system.

The kernel library includes two parts: a function that needs to be invoked in Java language, and a kernel library of ANDROID.

The application layer and the application framework layer are run on the virtual machine. The virtual machine executes JAVA files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional (3D) graphics processing library (for example, OpenGL Embedded System (ES)), and a two-dimensional (2D) graphics engine (for example, SGL).

The surface manager is configured to manage a display subsystem and provide fusion of 2D and 3D layers for a plurality of applications.

The media library supports playing and recording of a plurality of common audio and video formats, static image files, and the like. The media library may support a plurality of audio and video coding formats, for example, MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal device 100 with reference to a photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, to start the camera application. Then, the camera driver is started by invoking the kernel layer, and a static image or a video is captured by using the camera 193.

Figure 3:
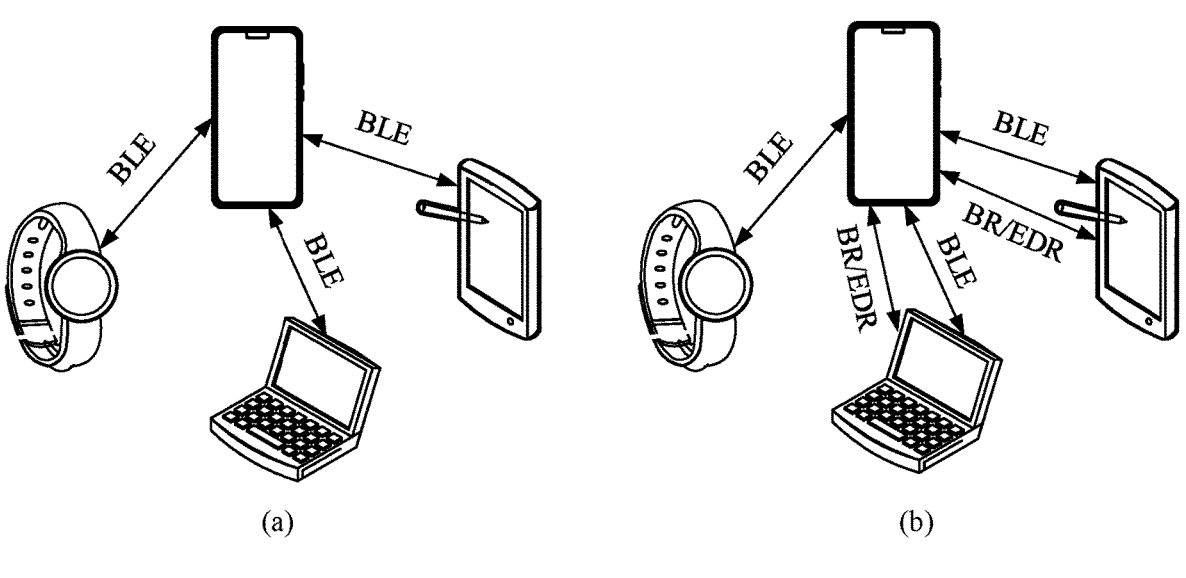
FIG. 3 and FIG. 4 are schematic diagrams of application scenarios according to an embodiment of this disclosure.

With reference to the accompanying drawings, the following describes in detail a BLUETOOTH communication method provided in embodiments of this disclosure. As shown in (a) in FIG. 3, the BLUETOOTH communication method provided in embodiments of this disclosure may be applied to a scenario in which networking and communication are performed between a terminal device and a plurality of other terminal devices through single BLUETOOTH (for example, BLE). As shown in (b) in FIG. 3, the BLUETOOTH communication method provided in embodiments of this disclosure may alternatively be applied to a scenario in which connection and data transmission are performed between a terminal device and a plurality of other terminal devices through both BLE and BR/EDR. The following uses the scenario shown in (b) in FIG. 3 as an example for description.

In embodiments of this disclosure, BLUETOOTH operating modes corresponding to a terminal device may be classified into a connection first mode, a transmission first mode, and a normal mode based on factors such as a BLUETOOTH communication request and an existing BLUETOOTH connection, and a preset operating parameter corresponding to each BLUETOOTH operating mode is configured. Then, each BLUETOOTH operating mode and the corresponding preset operating parameter may be stored in association in the terminal device or a third-party storage apparatus such as a cloud communicatively connected to the terminal device. The BLUETOOTH communication request may be a BLUETOOTH connection request, or may be a BLUETOOTH transmission request. The existing BLUETOOTH connection means that the terminal device has established a BLUETOOTH connection to another terminal device to perform BLUETOOTH communication. The established BLUETOOTH connection may be a BLE connection, or may be a BR/EDR connection. The preset operating parameter may include at least one of a connection interval of the BLE connection, a connection timeout period of the BLE connection, a broadcast cycle of a BLE broadcast, single broadcast duration of the BLE broadcast, a broadcast interval of the BLE broadcast, a scanning window ratio of BLE scanning, a transmission status of a BR/EDR connection, and the like.

It should be understood that the connection interval is a time interval between two connection events. The connection event is a process in which two terminal devices that have established a BLUETOOTH connection send data packets to each other. The connection timeout period is a time period in which two terminal devices that have established a BLUETOOTH connection do not communicate with each other during the connection and the connection is automatically disconnected. The single broadcast duration is broadcast duration in one broadcast cycle. The broadcast interval is a time interval between two broadcast events in the single broadcast duration. The scanning window is a time period for performing scanning once. The scanning window ratio is a time ratio of the scanning window to a scanning interval. The scanning interval is a time interval between two scanning windows, and the scanning interval may include a scanning rest time and a scanning execution time (namely, the scanning window). For example, when the scanning window ratio is 1/10 and the scanning interval is 10 milliseconds (ms), it indicates that the terminal device needs to perform BLUETOOTH scanning for only 1 ms in the time period of 10 ms.

In the connection first mode, a long connection interval and/or a long connection timeout period may be set for the BLE connection. The connection interval and/or the connection timeout period of the BLE connection may be prolonged, to adjust current occupation on a BLUETOOTH air interface by an existing BLE channel, and reduce impact of an existing BLE connection on a new BLUETOOTH connection, that is, reduce a conflict when a BLUETOOTH air interface resource is used by the existing BLUETOOTH connection and the new BLUETOOTH connection. This can provide sufficient BLUETOOTH air interface resources for the terminal device to process the new BLUETOOTH connection, and provide a stable and reliable BLUETOOTH connection capability for the new BLUETOOTH connection. This helps the terminal device preferentially establish the new BLUETOOTH connection, to meet an actual communication requirement, and improve user experience. For example, the connection interval of the BLE connection may be set to N*250 ms (1≤N≤4), for example, may be set to 500 ms. The connection timeout period of the BLE connection may be set to 10 s.

Optionally, in the connection first mode, if the BLE broadcast exists in the terminal device, a short broadcast interval may be further set for the BLE broadcast, to help quickly perform BLUETOOTH discovery and connection. For example, the broadcast interval of the BLE broadcast may be set to 20 ms.

Optionally, in the connection first mode, if the BLE scanning exists in the terminal device, a large scanning window ratio may be set for the BLE scanning, to help quickly perform BLUETOOTH discovery and connection. For example, the scanning window ratio of the BLE scanning may be set to 1/10.

Optionally, in the connection first mode, if data transmission is performed on a BR/EDR channel in the terminal device, the terminal device may first suspend data transmission on the BR/EDR channel, to adjust current occupation on a BLUETOOTH air interface by the existing BR/EDR channel, and reduce impact of an existing BR/EDR connection on a new BLUETOOTH connection. This can provide sufficient BLUETOOTH air interface resources for the terminal device to process the new BLUETOOTH connection, and provide a stable and reliable BLUETOOTH connection capability for the new BLUETOOTH connection. This helps the terminal device preferentially establish the new BLUETOOTH connection, to meet an actual communication requirement of a user. It should be understood that, after a newly requested BLUETOOTH connection is established, the terminal device may resume data transmission on the BR/EDR channel.

It should be noted that, the descriptions that the connection timeout period of the BLE connection is set to 10 s, the broadcast interval of the BLE broadcast is set to 20 ms, and the scanning window ratio of the BLE scanning is set to 1/10 are merely an example, and should not be understood as a limitation to embodiments of this disclosure. In embodiments of this disclosure, the connection timeout period of the BLE connection, the broadcast interval of the BLE broadcast, the scanning window ratio of the BLE scanning, and the like may be set to other values based on an actual situation.

In the transmission first mode, because data transmission mainly depends on the BR/EDR connection, a parameter of the BLE connection may be adjusted to reduce impact of the existing BLE connection on data transmission performed on a BR/EDR channel. Further, a long connection interval and/or a long connection timeout period may be set for the BLE connection, to reduce occupation on a BLUETOOTH air interface by the BLE connection. This provides more idle BLUETOOTH air interfaces for the terminal device to transmit data. Because a time period for data transmission is longer than a time period for the BLUETOOTH connection, a connection interval set for the BLE connection in the transmission first mode may be greater than a connection interval set for the BLE connection in the connection first mode. Similarly, a connection timeout period set for the BLE connection in the transmission first mode may be greater than a connection timeout period set for the BLE connection in the connection first mode. For example, the connection interval of the BLE connection may be set to M×200 ms (5≤M≤10), and the connection timeout period of the BLE connection may be set to 32 seconds (s).

Optionally, in the transmission first mode, if the BLE broadcast exists in the terminal device, a long broadcast interval may be further set for the BLE broadcast, to reduce impact of the BLE broadcast on data transmission performed on a BR/EDR channel. For example, the broadcast interval of the BLE broadcast may be set to S×50 ms (1≤S≤10).

Optionally, in the transmission first mode, if the BLE scanning exists in the terminal device, a small scanning window ratio may be set for the BLE scanning, to reduce a BLE scanning time period, and reduce impact of the BLE scanning on data transmission performed on a BR/EDR channel. For example, the scanning window ratio of the BLE scanning may be set to 1/50.

It should be noted that, in the transmission first mode, when data transmission is performed on a BR/EDR channel in the terminal device, the terminal device may search for a timeslot in which the BR/EDR channel performs data transmission. In addition, data transmission for a new transmission request may be performed in a timeslot that is not occupied by the BR/EDR channel.

In the normal mode, the connection interval of the BLE connection may be set to R×100 ms (1≤R≤10). The broadcast cycle of BLUETOOTH (such as BLE) may be set to T*100 s (1≤T≤5), for example, may be set to 300 s. Alternatively, the single broadcast duration of the BLUETOOTH broadcast may be set to 10 s to 20 s, for example, may be set to 10 s. The normal mode may be a resident BLUETOOTH operating mode of the terminal device.

Optionally, in the normal mode, when no data is transmitted on an established BR/EDR connection within first preset duration, the BR/EDR connection may be further disconnected. The first preset duration may be further set based on an actual situation, for example, may be set to 20 s.

Optionally, in the normal mode, when neither an established BR/EDR connection nor the BLE connection transmits data within second preset duration, a BLUETOOTH chip in the terminal device may be controlled to enter a sniff mode. The second preset duration may be set based on an actual situation, for example, may be set to 500 ms.

Optionally, in the normal mode, when the terminal device does not obtain a BLUETOOTH communication request within third preset duration, a BLUETOOTH chip in the terminal device may be controlled to enter a hold mode. The third preset duration may be further set based on an actual situation, for example, may be set to 200 s.

In this embodiment of this disclosure, when obtaining a BLUETOOTH communication request corresponding to a second terminal device, the first terminal device may obtain connection information of an existing BLUETOOTH connection in the first terminal device. The BLUETOOTH communication request corresponding to the second terminal device may be a BLUETOOTH communication request that is sent by the second terminal device to the first terminal device and that is used to request to communicate with the first terminal device, or may be a BLUETOOTH communication request that is generated by the first terminal device and that is used to communicate with the second terminal device. The BLUETOOTH communication request may carry a data transmission identifier and a device identifier corresponding to the second terminal device. The data transmission identifier may be used to indicate an amount of transmitted data in BLUETOOTH communication. The first terminal device may determine, based on the amount of transmitted data, a BLUETOOTH type for the BLU-ETOOTH communication. For example, when a large amount of data is transmitted, the first terminal device may determine that the BLUETOOTH type for BLUETOOTH communication is BR/EDR. When a small amount of data is transmitted, the first terminal device may determine that the BLUETOOTH type for BLUETOOTH communication is BLE. For example, the data transmission identifier may be 1 (namely, the second preset identifier in claims) or 0 (namely, the first preset identifier in claims). 1 is used to indicate that a large amount of data is transmitted, that is, an amount of transmitted data is greater than 32 kB. 0 is used to indicate that a small amount of data is transmitted, that is, an amount of transmitted data is less than or equal to 32 kB. The device identifier may be an identifier like a unique device code (Identity document (ID)) and/or a device name.

It should be understood that the connection information of the existing BLUETOOTH connection may include a quantity of existing BLUETOOTH connections, a BLUETOOTH type, a terminal device connected through each BLU-ETOOTH connection, a connection status, and the like. When the existing BLUETOOTH connection includes the BLE connection, the connection information of the existing BLUETOOTH connection may further include the connection interval of the BLE connection, a slave device delay of the BLE connection, the connection timeout period of the BLE connection, and the like. When the existing BLU-ETOOTH connection includes the BR/EDR connection, the connection information of the existing BLUETOOTH connection may further include a master/slave device, a packet sending interval, an asynchronous connectionless (ACL) packet type, and the like of the BR/EDR connection. The BLUETOOTH type may include BLE and BR/EDR. The terminal device connected through each BLUETOOTH connection is another terminal device connected to the first terminal device through BLUETOOTH, and may be represented by using a device identifier corresponding to each of the other terminal device, for example, may be represented by using a device ID corresponding to each of the other terminal device.

In addition, after obtaining the BLUETOOTH communication request corresponding to the second terminal device, the first terminal device may further obtain broadcast parameters such as a broadcast interval of BLUETOOTH and/or scanning parameters such as a scanning window ratio of BLUETOOTH scanning in the first terminal device. It may be understood that, to reduce power consumption of the first terminal device, the first terminal device mainly performs broadcasting and/or scanning through low-power BLE.

Therefore, after obtaining the BLUETOOTH communication request corresponding to the second terminal device, the first terminal device may obtain broadcast parameters such as the broadcast interval of the BLE broadcast and/or scanning parameters such as the scanning window ratio of the BLE scanning.

In this embodiment of this disclosure, after obtaining the connection information of the existing BLUETOOTH connection in the first terminal device, the first terminal device may determine, based on the obtained BLUETOOTH communication request and the obtained connection information, a BLUETOOTH operating mode corresponding to the first terminal device. The determined BLUETOOTH operating mode corresponding to the first terminal device is at least one of the connection first mode, the transmission first mode, and the normal mode that are preset.

It should be noted that, in this embodiment of this disclosure, the normal mode is a resident BLUETOOTH operating mode of the first terminal device. A priority of the connection first mode is higher than a priority of the transmission first mode. To be specific, when it is determined that the BLUETOOTH operating mode corresponding to the first terminal device is the connection first mode and the transmission first mode, the first terminal device may preferentially switch the BLUETOOTH operating mode corresponding to the first terminal device to the connection first mode. After processing a corresponding BLUETOOTH communication request in the connection first mode, the first terminal device may switch the BLUETOOTH operating mode corresponding to the first terminal device to the transmission first mode.

For example, the first terminal device may first perform matching between the device identifier in the BLUETOOTH communication request (the device identifier in the BLU-ETOOTH communication request is referred to as a first device identifier) and a corresponding device identifier of a terminal device connected through each BLUETOOTH connection (the corresponding device identifier of the terminal device connected through each BLUETOOTH connection is referred to as a second device identifier), to determine, by determining whether the first device identifier matches the corresponding second device identifier, whether the second terminal device has established a BLUETOOTH connection to the first terminal device. When the second device identifier that is the same as the first device identifier is not found, the first terminal device may determine that the second terminal device does not establish a BLUETOOTH connection to the first terminal device, that is, determine that the second terminal device is a new device that performs BLUETOOTH communication with the first terminal device. In this case, the first terminal device may determine the BLUETOOTH operating mode corresponding to the first terminal device based on the data transmission identifier carried in the BLUETOOTH communication request.

Further, when the data transmission identifier in the BLUETOOTH communication request is 0, the first terminal device may determine that the BLUETOOTH operating mode corresponding to the first terminal device is the connection first mode. To be specific, the first terminal device may switch the BLUETOOTH operating mode corresponding to the first terminal device to the connection first mode, to adjust an operating parameter of BLUETOOTH in the first terminal device based on a preset operating parameter corresponding to the connection first mode, for example, adjust a connection interval of the existing BLE connection in the first terminal device to 500 ms, adjust a connection timeout period of the existing BLE connection to 10 s, adjust the broadcast interval of the BLE broadcast to 20 ms, adjust the scanning window ratio of the BLE scanning to 1/10, and suspend data transmission on a connected BR/EDR channel. Then, the first terminal device may establish a BLE connection to the second terminal device through the BLUETOOTH whose operating parameter is adjusted.

When the data transmission identifier in the BLUETOOTH communication request is 1, the first terminal device may determine that the BLUETOOTH operating mode corresponding to the first terminal device is the connection first mode and the transmission first mode. In this case, the first terminal device may first switch the BLUETOOTH operating mode corresponding to the first terminal device to the connection first mode, to adjust an operating parameter of BLUETOOTH in the first terminal device based on a preset operating parameter corresponding to the connection first mode. Then, the first terminal device may establish a BR/EDR connection to the second terminal device through the BLUETOOTH whose operating parameter is adjusted. After establishing the BR/EDR connection to the second terminal device, the first terminal device may immediately switch the BLUETOOTH operating mode corresponding to the first terminal device to the transmission first mode, to further adjust the operating parameter of the BLUETOOTH in the first terminal device based on a preset operating parameter corresponding to the transmission first mode, for example, adjust a connection interval of the existing BLE connection in the first terminal device to 1200 ms, adjust a connection timeout period of the existing BLE connection to 32 s, adjust the broadcast interval of the BLE broadcast to 100 ms, and adjust the scanning window ratio of the BLE scanning to 1/50. After the operating parameter of the BLUETOOTH is adjusted, the first terminal device may transmit data between the first terminal device and the second terminal device through the established BR/EDR connection.

It should be understood that, when the second device identifier that is the same as the first device identifier is found, the first terminal device may obtain a BLUETOOTH type of an existing BLUETOOTH connection between the first terminal device and the second terminal device, and may determine, based on the BLUETOOTH type and the data transmission identifier in the BLUETOOTH communication request, the BLUETOOTH operating mode corresponding to the first terminal device.

Further, when it is determined that the BLUETOOTH type between the first terminal device and the second terminal device is BLE and the data transmission identifier in the BLUETOOTH communication request is 1, the first terminal device may determine that the BLUETOOTH operating mode corresponding to the first terminal device is the connection first mode and the transmission first mode. In this case, the first terminal device may first switch the BLUETOOTH operating mode corresponding to the first terminal device to the connection first mode, to adjust an operating parameter of BLUETOOTH in the first terminal device based on a preset operating parameter corresponding to the connection first mode. Then, a BR/EDR connection between the first terminal device and the second terminal device may be established through the BLUETOOTH whose operating parameter is adjusted. After the BR/EDR connection between the first terminal device and the second terminal device is established, the first terminal device may immediately switch the BLUETOOTH operating mode corresponding to the first terminal device to the transmission first mode, to further adjust the operating parameter of the BLUETOOTH in the first terminal device based on a preset operating parameter corresponding to the transmission first mode. After the operating parameter of the BLUETOOTH is adjusted, the first terminal device may transmit data between the first terminal device and the second terminal device through the established BR/EDR connection.

When it is determined that the BLUETOOTH type between the first terminal device and the second terminal device is BR/EDR and the data transmission identifier in the BLUETOOTH communication request is 1, the first terminal device may determine that the BLUETOOTH operating mode corresponding to the first terminal device is the transmission first mode. In this case, the first terminal device may directly switch the BLUETOOTH operating mode corresponding to the first terminal device to the transmission first mode, to adjust an operating parameter of BLUETOOTH in the first terminal device based on a preset operating parameter corresponding to the transmission first mode. After the operating parameter of the BLUETOOTH is adjusted, the first terminal device may transmit data between the first terminal device and the second terminal device through an existing BR/EDR connection between the first terminal device and the second terminal device.

It should be noted that, when the first terminal device obtains BLUETOOTH communication requests corresponding to a plurality of second terminal devices at the same time, the first terminal device may determine, based on the connection information of the existing BLUETOOTH connection in the first terminal device and the BLUETOOTH communication request corresponding to each second terminal device, the BLUETOOTH operating mode corresponding to the first terminal device. For example, when the first terminal device receives a BLUETOOTH communication request corresponding to a second terminal device A and a BLUETOOTH communication request corresponding to a second terminal device B at the same time, the first terminal device may determine, based on the connection information of the existing BLUETOOTH connection in the first terminal device and the BLUETOOTH communication request corresponding to the second terminal device A, a BLUETOOTH operating mode A corresponding to the first terminal device, and may determine, based on the connection information of the existing BLUETOOTH connection in the first terminal device and the BLUETOOTH communication request corresponding to the second terminal device B, a BLUETOOTH operating mode B corresponding to the first terminal device. When all BLUETOOTH operating modes determined based on each BLUETOOTH communication request are a same BLUETOOTH operating mode, the first terminal device may directly switch to the BLUETOOTH operating mode to process the BLUETOOTH communication request corresponding to each second terminal device. For example, when both the BLUETOOTH operating mode A and the BLUETOOTH operating mode B are the transmission first mode, the first terminal device may directly switch the BLUETOOTH operating mode corresponding to the first terminal device to the transmission first mode, to adjust the operating parameter of the BLUETOOTH in the first terminal device based on the preset operating parameter corresponding to the transmission first mode. In addition, after the operating parameter of the BLUETOOTH is adjusted, data transmission between the first terminal device and the second terminal device B may be performed through an existing BR/EDR connection between the first terminal device and the second terminal device A, and data transmission between the first terminal device and the second terminal device B may be performed through an existing BR/EDR connection between the first terminal device and the second terminal device B.

When all BLUETOOTH operating modes determined based on each BLUETOOTH communication request are different, the first terminal device may switch, based on determined priorities of all BLUETOOTH operating modes, the BLUETOOTH operating mode corresponding to the first terminal device. For example, when the BLUETOOTH operating mode A is the connection first mode, and the BLUETOOTH operating mode B is the connection first mode and the transmission first mode, because the priority of the connection first mode is higher than the priority of the transmission first mode, the first terminal device may first switch the BLUETOOTH operating mode corresponding to the first terminal device to the connection first mode, to adjust an operating parameter of BLUETOOTH in the first terminal device based on a preset operating parameter corresponding to the connection first mode. After the operating parameter of the BLUETOOTH is adjusted, a BLUETOOTH connection between the first terminal device and the second terminal device A may be established, and a BLUETOOTH connection between the first terminal device and the second terminal device B may be established. After it is determined that both the BLUETOOTH connection between the first terminal device and the second terminal device A and the BLUETOOTH connection between the first terminal device and the second terminal device B are established, the first terminal device may switch the BLUETOOTH operating mode corresponding to the first terminal device from the connection first mode to the transmission first mode, to adjust the operating parameter of the BLUETOOTH in the first terminal device based on the preset operating parameter corresponding to the transmission first mode. After the operating parameter of the BLUETOOTH is adjusted, data transmission between the first terminal device and the second terminal device B may be performed through a BR/EDR connection between the first terminal device and the second terminal device B.

In this embodiment of this disclosure, when the first terminal device does not obtain the BLUETOOTH communication request within fourth preset duration, and the first terminal device currently has no BLUETOOTH channel on which data transmission is being performed, the first terminal device may determine that the BLUETOOTH operating mode corresponding to the first terminal device is the normal mode. In this case, the first terminal device may switch the BLUETOOTH operating mode corresponding to the first terminal device to the normal mode, to adjust an operating parameter of BLUETOOTH in the first terminal device based on a preset operating parameter corresponding to the normal mode, for example, adjust the connection interval of the existing BLE connection in the first terminal device to 200 ms, adjust the broadcast cycle of the BLE broadcast to 300 s, and adjust the single broadcast duration of the BLE broadcast to 10 s. The fourth preset duration may be further set based on an actual situation, for example, may be set to 30 s.

The following describes the BLUETOOTH communication method provided in embodiments of this disclosure with reference to a specific application scenario.

Figure 4:
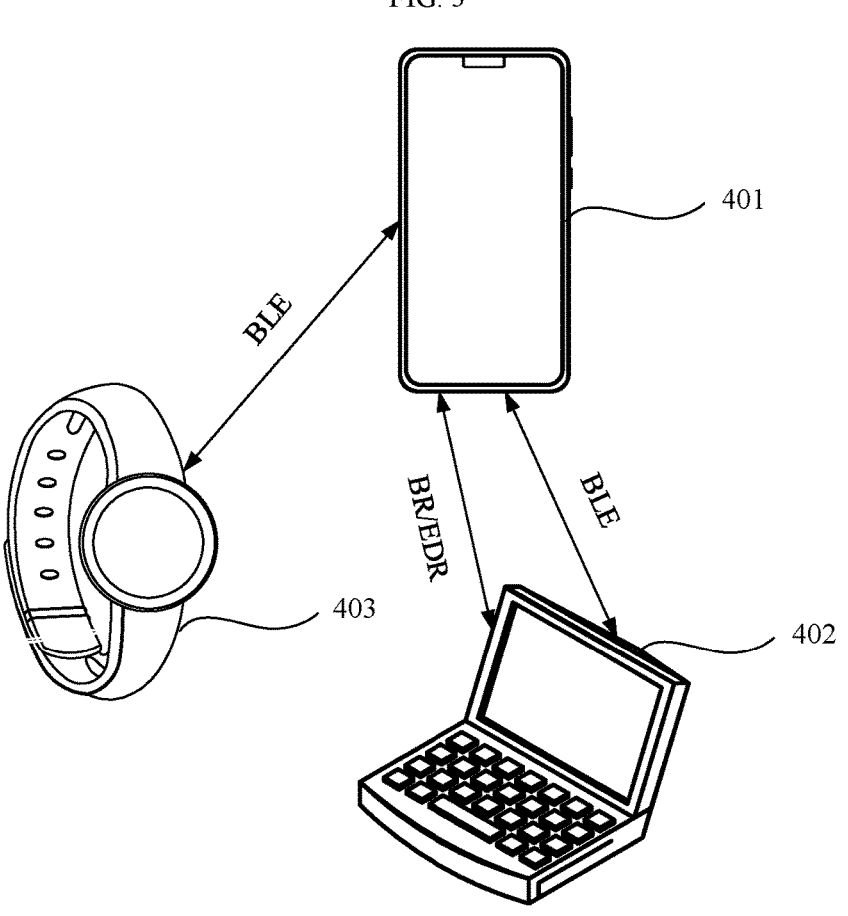

As shown in FIG. 4, in a scenario in which no BLUETOOTH connection is established between a first terminal device 401 and a second terminal device 402, or between the first terminal device 401 and a second terminal device 403, when the second terminal device 402 and the second terminal device 403 separately send BLUETOOTH connection requests to the first terminal device 401, to request networking with the first terminal device 401 (Networking means device information exchange, and only a small amount of data needs to be transmitted. BLE is often used for discovery, connection, and networking between devices due to advantages such as low power consumption and fast connection. That is, when networking is requested, data transmission identifiers in the BLUETOOTH connection requests sent by the second terminal device 402 and the second terminal device 403 are both 0), the first terminal device 401 may obtain connection information of an existing BLUETOOTH connection in the first terminal device 401. Subsequently, the first terminal device 401 may determine, based on the connection information of the existing BLUETOOTH connection and the BLUETOOTH connection request sent by the second terminal device 402, that the second terminal device 402 does not establish a BLUETOOTH connection to the first terminal device 401, and determine, based on the connection information of the existing BLUETOOTH connection and the BLUETOOTH connection request sent by the second terminal device 403, that the second terminal device 403 does not establish a BLUETOOTH connection to the first terminal device 401. In addition, when determining that the data transmission identifiers in the BLUETOOTH connection requests sent by the second terminal device 402 and the second terminal device 403 are both 0, the first terminal device 401 may determine that the first terminal device 401 needs to establish BLE connections to the second terminal device 402 and the second terminal device 403. In this case, the first terminal device 401 may switch a BLUETOOTH operating mode corresponding to the first terminal device 401 from an initial normal mode to a connection first mode, to establish the BLE connections to the second terminal device 402 and the second terminal device 403.

To establish the BLE connections, the first terminal device 401 may first establish the BLE connection between the first terminal device 401 and the second terminal device 402. In this case, because there is no existing BLUETOOTH connection in the first terminal device 401, the first terminal device 401 may directly establish the BLE connection between the first terminal device 401 and the second terminal device 402, without a need to perform parameter adjustment on the existing BLUETOOTH connection in the first terminal device 401. After the BLE connection between the first terminal device 401 and the second terminal device 402 is established, the first terminal device 401 may continue to establish the BLE connection between the first terminal device 401 and the second terminal device 403. In this case, because there is an existing BLUETOOTH connection (namely, the BLE connection between the first terminal device 401 and the second terminal device 402) in the first terminal device 401, the first terminal device 401 may first adjust an operating parameter of BLUETOOTH in the first terminal device based on a preset operating parameter corresponding to the connection first mode, for example, adjust a connection interval and a connection timeout period of the established BLE connection between the first terminal device 401 and the second terminal device 402. After the operating parameter of the BLUETOOTH is adjusted, the first terminal device 401 may continue to establish the BLE connection between the first terminal device 401 and the second terminal device 403.

It should be understood that, after both the BLE connections between the first terminal device 401 and the second terminal device 402 and between the first terminal device 401 and the second terminal device 403 are established, if the first terminal device 401 needs to share a large amount of data with the second terminal device 402, the first terminal device 401 may generate a BLUETOOTH transmission request for sending data to the second terminal device 402. A data transmission identifier in the BLUETOOTH transmission request is 1, and a device identifier is a device identifier corresponding to the second terminal device 402. Subsequently, the first terminal device 401 may determine, based on the BLUETOOTH transmission request and the connection information of the existing BLUETOOTH connection in the first terminal device 401, that the BLUETOOTH operating mode corresponding to the first terminal device 401 is the connection first mode and a transmission first mode. In this case, the first terminal device 401 may adjust the operating parameter of the BLUETOOTH in the first terminal device based on the preset operating parameter corresponding to the connection first mode, for example, adjust the connection interval and the connection timeout period of the BLE connection between the first terminal device 401 and the second terminal device 402, adjust a connection interval and a connection timeout period of the BLE connection between the first terminal device 401 and the second terminal device 403, and adjust broadcast parameters such as a broadcast interval of a BLE broadcast and scanning parameters such as a scanning window ratio of BLE scanning. After the operating parameter of the BLUETOOTH is adjusted, the first terminal device 401 may establish a BR/EDR connection to the second terminal device 402. After the BR/EDR connection between the first terminal device 401 and the second terminal device 402 is established, the first terminal device may switch the first terminal device 401 from the connection first mode to the transmission first mode, to adjust the operating parameter of the BLUETOOTH in the first terminal device based on a preset operating parameter corresponding to the transmission first mode. Then, the first terminal device 401 may transmit data to the second terminal device 402 based on the established BR/EDR connection.

It should be understood that, after data transmission between the first terminal device 401 and the second terminal device 402 is completed, if the first terminal device 401 does not obtain a BLUETOOTH communication request within 30 s, the first terminal device 401 may switch the BLUETOOTH operating mode corresponding to the first terminal device 401 from the transmission first mode to the normal mode.

Figure 5:
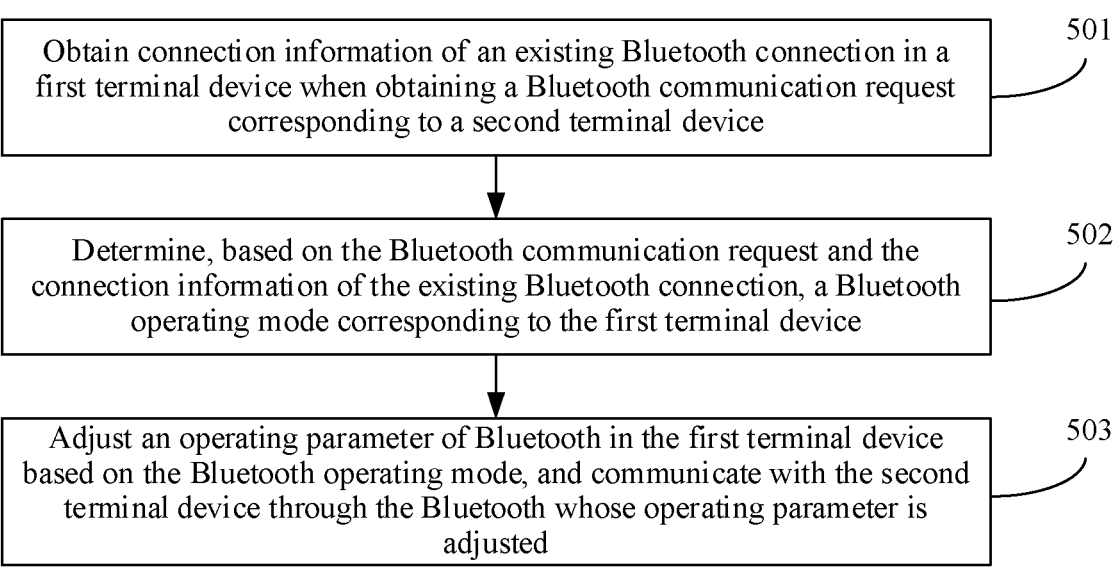
FIG. 5 is a schematic flowchart of a BLUETOOTH communication method according to an embodiment of this disclosure.

Based on the foregoing description, the following briefly describes a BLUETOOTH communication method provided in an embodiment of this disclosure. FIG. 5 is a schematic flowchart of a BLUETOOTH communication method according to an embodiment of this disclosure. The method may be applied to a first terminal device. As shown in FIG. 5, the method may include the following steps.

S501: Obtain connection information of an existing BLUETOOTH connection in the first terminal device when obtaining a BLUETOOTH communication request corresponding to a second terminal device.

S502: Determine, based on the BLUETOOTH communication request and the connection information of the existing BLUETOOTH connection, a BLUETOOTH operating mode corresponding to the first terminal device.

S503: Adjust an operating parameter of BLUETOOTH in the first terminal device based on the BLUETOOTH operating mode, and communicate with the second terminal device through the BLUETOOTH whose operating parameter is adjusted.

In this embodiment of this disclosure, when obtaining the BLUETOOTH communication request corresponding to the second terminal device, the first terminal device may determine, based on the BLUETOOTH communication request and the connection information of the existing BLUETOOTH connection in the first terminal device, the BLUETOOTH operating mode currently corresponding to the first terminal device, to adjust the operating parameter of the BLUETOOTH based on the BLUETOOTH operating mode, so as to adjust current occupation on a BLUETOOTH air interface by the existing BLUETOOTH connection in the first terminal device, and reduce a BLUETOOTH air interface resource conflict in a plurality of BLUETOOTH connections. In this way, sufficient and stable BLUETOOTH air interface resources may be provided for the first terminal device to process the BLUETOOTH communication request. This ensures that the BLUETOOTH communication request is processed in a timely and effective manner, improves efficiency and a success rate of processing the BLUETOOTH communication request, meets an actual communication requirement of a user, and improves user experience, so that usability and practicability are high.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this disclosure.

Figure 6:
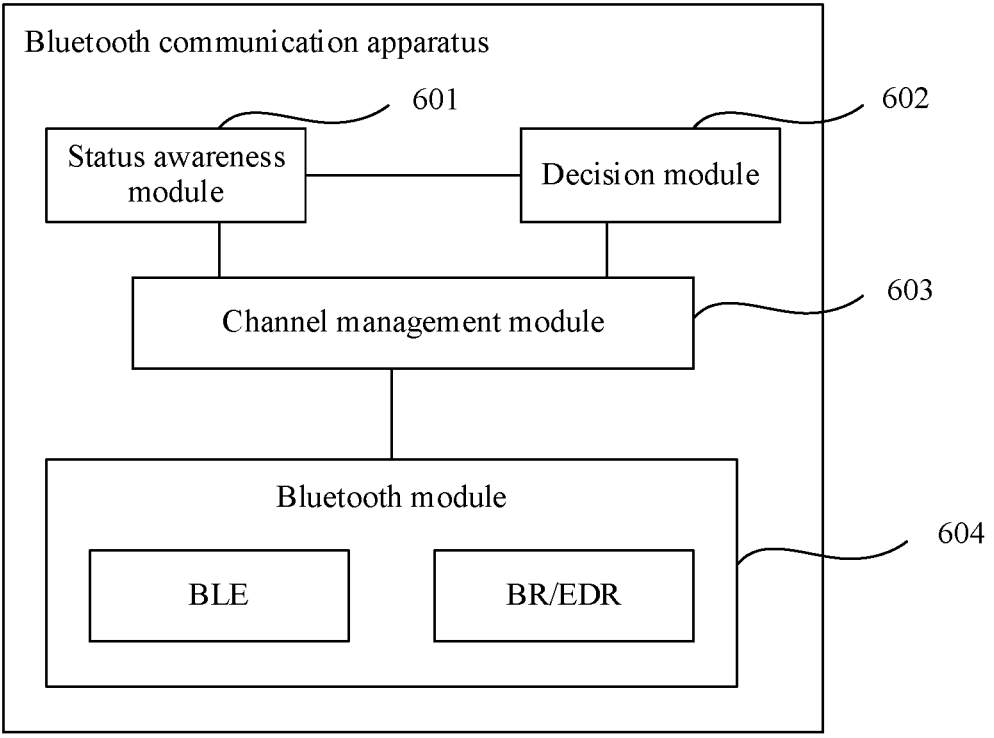
FIG. 6 is a schematic diagram of a structure of a communication apparatus according to an embodiment of this disclosure.

Corresponding to the BLUETOOTH communication method described in the foregoing embodiments, FIG. 6 is a block diagram of a structure of a BLUETOOTH communication apparatus according to an embodiment of this disclosure. The BLUETOOTH communication apparatus provided in this embodiment of this disclosure is used in a first terminal device. For ease of description, only a part related to this embodiment of this disclosure is shown.

Refer to FIG. 6. The apparatus may include a status awareness module 601, a decision module 602, a channel management module 603, and a BLUETOOTH module 604. The status awareness module 601 is configured to obtain a BLUETOOTH communication request corresponding to a second terminal device, and obtain connection information of an existing BLUETOOTH connection of the first terminal device from the channel management module 603. The decision module 602 is configured to obtain the BLUETOOTH communication request and the connection information of the existing BLUETOOTH connection from the status awareness module 601, determine, based on the BLUETOOTH communication request and the connection information of the existing BLUETOOTH connection, a BLUETOOTH operating mode corresponding to the first terminal device, and send the determined BLUETOOTH operating mode to the channel management module 603. The channel management module 603 is configured to obtain the connection information of the existing BLUETOOTH connection in the first terminal device from the BLUETOOTH module 604, and adjust, based on the BLUETOOTH operating mode sent by the decision module 602, an operating parameter corresponding to the BLUETOOTH module 604. The BLUETOOTH module 604 is configured to communicate with the second terminal device through the BLUETOOTH whose operating parameter is adjusted.

It should be noted that a format of the BLUETOOTH communication request is specified in the status awareness module 601. The BLUETOOTH communication request needs to carry a data transmission identifier and a device identifier (for example, a device ID) corresponding to a to-be-communicated terminal device. The device identifier is used to distinguish a plurality of terminal devices connected for interaction, and the data transmission identifier is used to distinguish an amount of transmitted data in communication. A BLUETOOTH type for communication is determined based on the amount of transmitted data.

Optionally, after detecting that connected BLUETOOTH is used up, the status awareness module 601 may send a recovery instruction to the decision module 602. To be specific, when the status awareness module 601 does not obtain a BLUETOOTH communication request within preset duration, and the channel management module 603 does not indicate the status awareness module 601 that there is an ongoing BLUETOOTH channel for transmission, the status awareness module 601 may send the recovery instruction to the decision module 602. Then, the decision module 602 may notify the channel management module 603 to adjust an operating parameter of BLUETOOTH to a preset operating parameter corresponding to a normal mode, to restore BLUETOOTH of the first terminal device to the normal mode.

In a possible implementation, the BLUETOOTH communication request carries a data transmission identifier and a first device identifier corresponding to the second terminal device. The connection information of the existing BLUETOOTH connection includes a second device identifier corresponding to a terminal device connected through the existing BLUETOOTH connection.

The decision module 602 may include an identifier matching unit configured to perform matching between the first device identifier in the BLUETOOTH communication request and the second device identifier in the connection information, and a first decision unit configured to, when a second device identifier matching the first device identifier does not exist, determine, based on the data transmission identifier in the BLUETOOTH communication request, the BLUETOOTH operating mode corresponding to the first terminal device.

Optionally, the first decision unit may include a first decision subunit configured to, when the data transmission identifier is a first preset identifier, determine that the BLUETOOTH operating mode corresponding to the first terminal device is a connection first mode, and a second decision subunit configured to, when the data transmission identifier is a second preset identifier, determine that the BLUETOOTH operating mode corresponding to the first terminal device is a connection first mode and a transmission first mode.

An amount of transmitted data corresponding to the first preset identifier is less than an amount of transmitted data corresponding to the second preset identifier.

Optionally, the decision module 602 may further include a BLUETOOTH type obtaining unit configured to, when the second device identifier matching the first device identifier exists, obtain a BLUETOOTH type of an existing BLUETOOTH connection between the first terminal device and the second terminal device, and a second decision unit configured to determine, based on the BLUETOOTH type and the data transmission identifier in the BLUETOOTH communication request, the BLUETOOTH operating mode corresponding to the first terminal device.

For example, the second decision unit may include a third decision subunit configured to, when the BLUETOOTH type is a BLE connection, and the data transmission identifier in the BLUETOOTH communication request is the second preset identifier, determine that the BLUETOOTH operating mode corresponding to the first terminal device is the connection first mode and the transmission first mode, and a fourth decision subunit configured to, when the BLUETOOTH type is a classic BLUETOOTH connection, and the data transmission identifier in the BLUETOOTH communication request is the second preset identifier, determine that the BLUETOOTH operating mode corresponding to the first terminal device is the transmission first mode.

Optionally, the channel management module 603 may include a first parameter adjustment unit and a second parameter adjustment unit. The BLUETOOTH module 604 may include a first BLUETOOTH communication unit and a second BLUETOOTH communication unit.

The first parameter adjustment unit is configured to adjust an operating parameter of BLUETOOTH in the first terminal device based on the connection first mode.

The first BLUETOOTH communication unit is configured to establish a classic BLUETOOTH connection between the first terminal device and the second terminal device through the BLUETOOTH whose operating parameter is adjusted.

The second parameter adjustment unit is configured to adjust the operating parameter of the BLUETOOTH in the first terminal device based on the transmission first mode after determining that the classic BLUETOOTH connection is established between the first terminal device and the second terminal device.

The second BLUETOOTH communication unit is configured to transmit data between the first terminal device and the second terminal device through the established classic BLUETOOTH connection.

In a possible implementation, when BLUETOOTH communication requests corresponding to a plurality of second terminal devices are obtained, the decision module 602 may further include an operating mode determining unit configured to determine, based on each BLUETOOTH communication request and the connection information of the existing BLUETOOTH connection, the BLUETOOTH operating mode corresponding to the first terminal device.

The channel management module 603 may further include a third parameter adjustment unit, a fourth parameter adjustment unit, and a fifth parameter adjustment unit. The BLUETOOTH module 604 may further include a third BLUETOOTH communication unit, a fourth BLUETOOTH communication unit, and a fifth BLUETOOTH communication unit.

The third parameter adjustment unit is configured to adjust the operating parameter of the BLUETOOTH in the first terminal device based on the BLUETOOTH operating mode when all BLUETOOTH operating modes are a same BLUETOOTH operating mode.

The third BLUETOOTH communication unit is configured to communicate with the second terminal device through the BLUETOOTH whose operating parameter is adjusted.

The fourth parameter adjustment unit is configured to adjust the operating parameter of the BLUETOOTH in the first terminal device based on the connection first mode when each BLUETOOTH operating mode includes the connection first mode and the transmission first mode.

The fourth BLUETOOTH communication unit is configured to establish, through the BLUETOOTH whose operating parameter is adjusted, BLUETOOTH connections between the first terminal device and all of the second terminal devices that request to establish a BLUETOOTH connection.

The fifth parameter adjustment unit is configured to adjust the operating parameter of the BLUETOOTH in the first terminal device based on the transmission first mode after determining that the BLUETOOTH connections are established between the first terminal device and all of the second terminal devices that request to establish a BLUETOOTH connection.

The fifth BLUETOOTH communication unit is configured to transmit data through the BLUETOOTH whose operating parameter is adjusted.

Optionally, the channel management module 603 may further include a sixth parameter adjustment unit configured to adjust the operating parameter of the BLUETOOTH in the first terminal device based on a preset operating parameter corresponding to the BLUETOOTH operating mode. The preset operating parameter is at least one of a connection interval of a BLE connection, a connection timeout period of the BLE connection, a broadcast interval of a BLE broadcast, a scanning window ratio of BLE scanning, and a transmission status of classic BLUETOOTH.

It should be noted that content such as information exchange between the foregoing apparatuses/units and the execution processes thereof is based on a same concept as the method embodiments of this disclosure. For specific functions and technical effects of the content, refer to the method embodiments. Details are not described herein again.

Persons skilled in the art may clearly understand that, for the purpose of convenient and brief description, division into the foregoing function units or modules is merely used as an example for description. In an actual application, the foregoing functions may be allocated to different function units or modules for implementation based on a requirement. That is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this disclosure. For a specific working process of the units or modules in the foregoing system, refer to a corresponding process in the foregoing method embodiments. Details are not described herein again.

An embodiment of this disclosure further provides a terminal device. The terminal device includes at least one memory, at least one processor, and a computer program that is stored in the at least one memory and that can be run on the at least one processor. When the processor executes the computer program, the terminal device is enabled to implement the steps in any one of the foregoing method embodiments. For example, a structure of the terminal device may be shown in FIG. 1.

An embodiment of this disclosure further provides a computer-readable storage medium. The computer-readable storage medium stores a computer program. When the computer program is executed by a computer, the computer is enabled to implement the steps in any one of the foregoing method embodiments.

An embodiment of this disclosure provides a computer program product. When the computer program product runs on a terminal device, the terminal device is enabled to implement the steps in any one of the foregoing method embodiments.

When the integrated unit is implemented in the form of the software function unit and sold or used as an independent product, the integrated unit may be stored in a computer-readable storage medium. Based on such an understanding, all or some of the procedures of the method in embodiments of this disclosure may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable storage medium may include at least any entity or apparatus that can carry computer program code to an apparatus/terminal device, a recording medium, a computer memory, a read-only memory (ROM), a RAM, an electrical carrier signal, a telecommunication signal, and a software distribution medium, for example, a USB flash drive, a removable hard disk, a magnetic disk, or an optical disk. In some jurisdictions, the computer-readable storage medium cannot be the electrical carrier signal or the telecommunication signal according to legislation and patent practices.

In the foregoing embodiments, the description of each embodiment has respective focuses. For a part that is not described in detail or recorded in an embodiment, refer to related descriptions in other embodiments.

Persons of ordinary skill in the art may be aware that the units and algorithm steps described with reference to the examples in embodiments disclosed in this specification may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

In embodiments provided in this disclosure, it should be understood that the disclosed apparatus/terminal device and method may be implemented in other manners. For example, the described apparatus/terminal device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

The foregoing embodiments are merely intended to describe the technical solutions of this disclosure, but are not to limit this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this disclosure, and these modifications and replacements shall fall within the protection scope of this disclosure.

The invention claimed is:

1. A method implemented by a first terminal device, wherein the method comprises:

obtaining a BLUETOOTH communication request from a second terminal device, wherein the BLUETOOTH communication request carries a data transmission identifier and a first device identifier corresponding to the second terminal device, while obtaining connection information of a first existing BLUETOOTH connection in the first terminal device, wherein the connection information comprises a second device identifier corresponding to a third terminal device connected through the first existing BLUETOOTH connection;

performing matching between the first device identifier and the second device identifier;

determining, based on the data transmission identifier when the second device identifier does not match the first device identifier, a BLUETOOTH operating mode corresponding to the first terminal device;

adjusting a BLUETOOTH operating parameter in the first terminal device based on the BLUETOOTH operating mode to obtain an adjusted operating parameter; and communicating with the second terminal device by using the adjusted operating parameter.

2. The method of claim 1, further comprising:

determining that the BLUETOOTH operating mode is a connection first mode when the data transmission identifier is a first preset identifier; and determining that the BLUETOOTH operating mode comprises the connection first mode and a transmission first mode when the data transmission identifier is a second preset identifier, wherein a first amount of transmitted data corresponding to the first preset identifier is less than a second amount of transmitted data corresponding to the second preset identifier.

3. The method of claim 1, wherein after performing matching between the first device identifier and the second device identifier, the method further comprises:

obtaining a BLUETOOTH type of a second existing BLUETOOTH connection between the first terminal device and the second terminal device when the second device identifier matches the first device identifier; and determining, based on the BLUETOOTH type, the BLUETOOTH operating mode.

4. The method of claim 3, further comprising:

determining that the BLUETOOTH operating mode comprises a connection first mode and a transmission first mode when the BLUETOOTH type is BLUETOOTH Low Energy (BLE) and the data transmission identifier is a preset identifier; and determining that the BLUETOOTH operating mode is the transmission first mode when the BLUETOOTH type is classic BLUETOOTH and the data transmission identifier is the preset identifier.

5. The method of claim 2, wherein after determining that the BLUETOOTH operating mode comprises the connection first mode and the transmission first mode, the method further comprises:

further adjusting the operating parameter based on the connection first mode;

establishing a classic BLUETOOTH connection between the first terminal device and the second terminal device by using the operating parameter adjusted based on the connection first mode;

further adjusting the operating parameter based on the transmission first mode after establishing the classic BLUETOOTH connection; and performing data transmission between the first terminal device and the second terminal device through the classic BLUETOOTH connection.

6. The method of claim 1, further comprising:

obtaining BLUETOOTH communication requests corresponding to a plurality of second terminal devices; and determining, based on each of the BLUETOOTH communication requests a BLUETOOTH operating mode of each of the plurality of second terminal devices;

when all BLUETOOTH operating modes are a same BLUETOOTH operating mode:

further adjusting the operating parameter based on the same BLUETOOTH operating mode; and communicating with each of the second terminal devices by using the operating parameter adjusted based on the operating mode;

when all BLUETOOTH operating modes comprise a connection first mode and a transmission first mode:

further adjusting the operating parameter based on the connection first mode; and establishing, by using the operating parameter adjusted based on the connection first mode, BLUETOOTH connections between the first terminal device and the second terminal devices that request to establish a BLUETOOTH connection; and after establishing the BLUETOOTH connections:

further adjusting the operating parameter based on the transmission first mode; and performing data transmission by using the operating parameter adjusted based on the transmission first mode.

7. The method of claim 1, further comprising adjusting the operating parameter based on a preset operating parameter corresponding to the BLUETOOTH operating mode, wherein the preset operating parameter is at least one of:

a connection interval of a BLUETOOTH Low Energy (BLE) connection;

a connection timeout period of the BLE connection;

a broadcast interval of a BLE broadcast;

a scanning window ratio of BLE scanning; or a transmission status of classic BLUETOOTH.

8. A first terminal device comprising:

a memory configured to store instructions; and a processor coupled to the memory and configured to execute the instructions to cause the first terminal device to:

obtain a BLUETOOTH communication request from a second terminal device, wherein the BLUETOOTH communication request carries a data transmission identifier and a first device identifier corresponding to the second terminal device, while obtaining connection information of a first existing BLUETOOTH connection in the first terminal device, wherein the connection information comprises a second device identifier corresponding to a third terminal device connected through the first existing BLUETOOTH connection;

perform matching between the first device identifier and the second device identifier;

determine, based on the data transmission identifier when the second device identifier does not match the first device identifier, a BLUETOOTH operating mode corresponding to the first terminal device;

adjust an operating parameter of BLUETOOTH in the first terminal device based on the BLUETOOTH operating mode to obtain an adjusted operating parameter; and communicate with the second terminal device by using the adjusted operating parameter.

9. The first terminal device of claim 8, wherein the processor is further configured to execute the instructions to cause the first terminal device to:

determine that the BLUETOOTH operating mode is a connection first mode when the data transmission identifier is a first preset identifier; and determine that the BLUETOOTH operating mode comprises the connection first mode and a transmission first mode when the data transmission identifier is a second preset identifier, wherein a first amount of transmitted data corresponding to the first preset identifier is less than a second amount of transmitted data corresponding to the second preset identifier.

10. The first terminal device of claim 8, wherein the processor is further configured to execute the instructions to cause the first terminal device to:

obtain a BLUETOOTH type of a second existing BLUETOOTH connection between the first terminal device and the second terminal device when the second device identifier matches the first device identifier; and determine, based on the BLUETOOTH type, the BLUETOOTH operating mode.

11. The first terminal device of claim 10, wherein the processor is further configured to execute the instructions to cause the first terminal device to:

determine that the BLUETOOTH operating mode comprises a connection first mode and a transmission first mode when the BLUETOOTH type is BLUETOOTH Low Energy (BLE) and the data transmission identifier is a preset identifier; and determine that the BLUETOOTH operating mode is the transmission first mode when the BLUETOOTH type is classic BLUETOOTH and the data transmission identifier is the preset identifier.

12. The first terminal device of claim 9, wherein the processor is further configured to execute the instructions to cause the first terminal device to:

further adjust the operating parameter based on the connection first mode;

establish a classic BLUETOOTH connection between the first terminal device and the second terminal device by using the operating parameter adjusted based on the connection first mode;

further adjust the operating parameter based on the transmission first mode after establishing the classic BLUETOOTH connection; and perform data transmission between the first terminal device and the second terminal device through the classic BLUETOOTH connection.

13. The first terminal device of claim 8, wherein the processor is further configured to execute the instructions to cause the first terminal device to:

obtain BLUETOOTH communication requests corresponding to a plurality of second terminal devices; and determine, based on each of the BLUETOOTH communication requests, the BLUETOOTH operating mode of each of the plurality of second terminal devices;

when all BLUETOOTH operating modes are a same BLUETOOTH operating mode:

further adjust the operating parameter based on the same BLUETOOTH operating mode; and communicate with each of the second terminal devices by using the operating parameter adjusted based on the operating mode;

when all BLUETOOTH operating modes comprise a connection first mode and a transmission first mode:

further adjust the operating parameter based on the connection first mode; and establish, by using the operating parameter adjusted based on the connection first mode, connections between the first terminal device and the second terminal devices that request to establish a BLUETOOTH connection; and after establishing the BLUETOOTH connections:

further adjust the operating parameter based on the transmission first mode; and perform data transmission by using the operating parameter adjusted based on the transmission first mode.

14. The first terminal device of claim 8, wherein the processor is further configured to execute the instructions to cause the first terminal device to further adjust the operating parameter based on a preset operating parameter corresponding to the BLUETOOTH operating mode, wherein the preset operating parameter is at least one of:

a connection interval of a BLUETOOTH Low Energy (BLE) connection;

a connection timeout period of the BLE connection;

a broadcast interval of a BLE broadcast;

a scanning window ratio of BLE scanning; or a transmission status of classic BLUETOOTH.

15. A computer program product comprising computer-executable instructions that are stored on a non-transitory readable medium and that, when executed by a processor, cause a first terminal device to:

obtain a BLUETOOTH communication request from a second terminal device, wherein the BLUETOOTH communication request carries a data transmission identifier and a first device identifier corresponding to the second terminal device, while obtaining connection information of a first existing BLUETOOTH connection in the first terminal device, wherein the connection information comprises a second device identifier corresponding to a third terminal device connected through the first existing BLUETOOTH connection;

perform matching between the first device identifier and the second device identifier;

determine, based on the data transmission identifier when the second device identifier does not match the first device identifier, a BLUETOOTH operating mode corresponding to the first terminal device;

adjust an operating parameter of BLUETOOTH in the first terminal device based on the BLUETOOTH operating mode to obtain an adjusted operating parameter; and communicate with the second terminal device by using the adjusted operating parameter.

16. The computer program product of claim 15, wherein the computer-executable instructions further cause the first terminal device to:

determine that the BLUETOOTH operating mode is a connection first mode when the data transmission identifier is a first preset identifier; and determine that the BLUETOOTH operating mode is the connection first mode and a transmission first mode when the data transmission identifier is a second preset identifier, wherein a first amount of transmitted data corresponding to the first preset identifier is less than a second amount of transmitted data corresponding to the second preset identifier.

17. The computer program product of claim 15, wherein the computer-executable instructions further cause the first terminal device to:

obtain a BLUETOOTH type of a second existing BLUETOOTH connection between the first terminal device and the second terminal device when the second device identifier matches the first device identifier; and determine, based on the BLUETOOTH type, the BLUETOOTH operating mode.

18. The computer program product of claim 17, wherein the computer-executable instructions further cause the first terminal device to:

determine that the BLUETOOTH operating mode comprises a connection first mode and a transmission first mode when the BLUETOOTH type is BLUETOOTH Low Energy (BLE) and the data transmission identifier is a preset identifier; and determine that the BLUETOOTH operating mode is the transmission first mode when the BLUETOOTH type is classic BLUETOOTH and the data transmission identifier is the preset identifier.

19. The computer program product of claim 16, wherein the computer-executable instructions further cause the first terminal device to:

further adjust the operating parameter based on the connection first mode;

establish a classic BLUETOOTH connection between the first terminal device and the second terminal device by using the operating parameter adjusted based on the connection first mode;

further adjust the operating parameter based on the transmission first mode after establishing the classic BLUETOOTH connection; and perform data transmission between the first terminal device and the second terminal device through the classic BLUETOOTH connection.

20. The computer program product of claim 15, wherein the computer-executable instructions further cause the first terminal device to:

obtain BLUETOOTH communication requests corresponding to a plurality of second terminal devices; and determine, based on each of the BLUETOOTH communication requests, the BLUETOOTH operating mode of each of the plurality of second terminal devices; and when all BLUETOOTH operating modes are a same BLUETOOTH operating mode:

further adjust the operating parameter based on the same BLUETOOTH operating mode; and communicate with each of the second terminal devices by using the operating parameter adjusted based on the operating mode;

when all BLUETOOTH operating modes comprise a connection first mode and a transmission first mode:

further adjust the operating parameter based on the connection first mode; and establish, by using the operating parameter adjusted based on the connection first mode, connections between the first terminal device and the second terminal devices that request to establish a BLUETOOTH connection; and after establishing the BLUETOOTH connections:

further adjust the operating parameter based on the transmission first mode; and perform data transmission by using the operating parameter adjusted based on the transmission first mode.

* * * * *